US007397675B2

(12) United States Patent
Neacsu (10) Patent No.: US 7,397,675 B2
(45) Date of Patent: Jul. 8, 2008

(54) INVERTER-FILTER NON-LINEARITY BLANKING TIME AND ZERO CURRENT CLAMPING COMPENSATION SYSTEM AND METHOD

(75) Inventor: Dorin O. Neacsu, Westford, MA (US)

(73) Assignee: Azure Dynamics, Inc., Woburn, MA (US)

( * ) Notice: Subject to any disclaimer, the term of this patent is extended or adjusted under 35 U.S.C. 154(b) by 23 days.

(21) Appl. No.: 11/582,804

(22) Filed: Oct. 18, 2006

(65) Prior Publication Data

US 2008/0094863 A1 Apr. 24, 2008

(51) Int. Cl.
 *H02M 1/12* (2006.01)
 *H02H 7/122* (2006.01)
(52) U.S. Cl. .................. 363/41; 363/56.04; 363/98
(58) Field of Classification Search .............. 363/39, 363/40–42, 55, 56.01, 56.02, 56.03, 56.04, 363/97, 98, 131, 132
 See application file for complete search history.

(56) References Cited

U.S. PATENT DOCUMENTS

| | | | |
|---|---|---|---|
| 5,206,802 A | 4/1993 | Blasko | |
| 5,550,450 A | 8/1996 | Palko et al. | |
| 5,872,710 A | 2/1999 | Kameyama | |
| 7,075,260 B2 * | 7/2006 | Maeda | 318/443 |
| 7,161,323 B2 * | 1/2007 | Ajima et al. | 318/629 |

OTHER PUBLICATIONS

Jong-Woo Choi, Student Member, IEEE, *A New Compensation Strategy REducing Voltage/Current Distortion in PWM VSI Systems Operation with Low Output Voltages*, IEEE Transactions on Industry Applications, Volt. 31, No. 5, Sep./Oct. 1995, pp. 1001-1008.
Choi et al., "New Dead-Time Compensation Eliminating Zero Current Clamping in Voltage-Fed PWM Inverter", IEEE IECON, IEEE Transactions on Industry Application, vol. 31, Issue 5, 1994, pp. 977-984.
Ben-Brahim, "Analysis and Compensation of Dead-Time Effects in Three Phase PWM Inverters", IEEE IECON, 1998 pp. 792-797.
J. Kimball et al., *Real Time Optimization of Dead-Time for Motor Control Inverters*, IEEE PESC 1997, Jun. 22-27, pp. 597-600, vol. 1.
Y. Murai, et al., *PWM Strategy for High-Frequency Carrier Inverters Elimnating Current Clamps During Switching Dead-Time*, IEEE IECON, pp. 317-322, vol. 1.

(Continued)

*Primary Examiner*—Gary L Laxton
(74) *Attorney, Agent, or Firm*—Iandiorio Teska & Coleman (57) ABSTRACT

Inverter-filter non-linearity blanking time and zero current clamping compensation is accomplished by comparing the average output current with the discontinuous current mode threshold values to determine when the average output current is entering a discontinuous current mode and introducing a compensation voltage to the inverter drive voltage in response to the average output current entering a discontinuous current mode to compensate for discontinuous current mode distortion of the inverter output voltage.

19 Claims, 11 Drawing Sheets

OTHER PUBLICATIONS

Choi et al., *Inverter Output Voltage Synthesis Using Novel Dead-Time Compensation*, IEEE PESC 1994, pp. 100-106.

D. Legate et al., *Pulse-Based Dead-Time Compensator for PWM Voltage Inverters*, IEEE Trans. On IE, vol. 44, No. 2, Apr. 1997, pp. 191 197.

T. J. Summers et al., *Dead-Time issues in Predictive Current Control*, IEEE Transactions on Industry Applications, vol. 40, Issue 3, May-Jun. 2004, pp. 835-844.

A. Munoz et al., *On-Line Dead-Time Compensation Technique for Open-Loop PWM-VSI Drives*, IEEE Tans on PE, vol. 14, No. 4, Jul. 1999, pp. 683-689.

* cited by examiner

INVERTER-FILTER NON-LINEARITY BLANKING TIME AND ZERO CURRENT CLAMPING COMPENSATION SYSTEM AND METHOD

FIELD OF THE INVENTION

This invention relates to an inverter-filter non-linearity blanking time and zero current clamping compensation system and method.

BACKGROUND OF THE INVENTION

Sinusoidal voltages can be generated in a single-phase or three-phase configuration through a power converter followed by a passive filter. In an open-loop system or a closed loop system controlling the RMS value, the output voltage experiences a distortion due to the filter inductance and the natural operation of the semiconductor devices. This particular distortion reduces the RMS of the output voltage and deteriorates the total harmonic distortion (THD) of the output voltage, often in excess of conventional standards.

An auxiliary power distribution system (APDS) is comprised of an inverter and a passive filter. Different filter topologies have been used to cancel the effects of the harmonics produced by the switching operation of the pulse width modulation (PWM) inverter. These filter topologies include e.g. single or multiple low-pass LC filters, combinations of low-pass LC filters and trap resonant filters. Typically these solutions start with an inductor at the inverter leg or have an equivalent inductive character at the fundamental frequency. This inductor is seeing the inverter pole voltage on one side and a sinusoidal voltage on the other side. The ripple of the current through insulated gate bipolar transistors (IGBTs) and the filter inductor is calculated from the voltage drop across the inductor.

Due to the real characteristics of the power semiconductor devices with finite delays and switching times, a time interval is introduced between the turn-off of an IGBT and the turn-on of the other IGBT on the same leg. This interval is called blanking time. Despite the advantages in protection of the power stage, the blanking time interval alters the effective value of each pulse depending on the current direction. Under positive current, the low-side diode turns on after the high-side IGBT turns off. The effective value of the voltage on the load is decreased by an interval equal to $V_{dc}*t_b/T$, $t_b$ being the blanking time. In contrast, a negative current increases the pulse voltage by $V_{dc}*t_b/T$. Finally, if the current crosses the zero axis, the pulse width is preserved within some limits, but the pulse is shifted. These limits depend on the actual size of the command or reference pulse.

This problem is well known in motor drive applications where the current is quasi-sinusoidal. Different compensation methods have been reported, based on pulse width feedback, fast current compensation, or open-loop voltage compensation. The simplest compensation adds a supplemental square-wave to the reference signal with a magnitude equal to the $t_b/T$ (for a unity reference) and phase synchronized with current direction. The amount of voltage error to be compensated does not depend on the amount of current but on the current direction.

A compensation for the voltage error due to the blanking time is difficult to implement in the case of an inverter-filter system due to the multiple crossings of the zero axis of the current. The compensation would consist of adding a voltage during the intervals of purely positive current and subtracting a voltage during the intervals with purely negative currents. There is no blanking time compensation required during the intervals when the current crosses the zero axis. The simplest implementation following this reasoning is based on a quasi-square waveform. Such a method is very similar to the blanking time compensation used in motor drives.

The conventional compensation for the blanking time applied to a system having zero current clamping distortion is based on determining the amount of compensation required. As previously explained the blanking time compensation for the distorted voltage waveform differs from the original ones by a quasi-square wave. The RMS value of the component on the fundamental frequency will be decreased by the corresponding RMS value of the fundamental component of the square wave corresponding to the blanking time. This simple compensation is close to the requirements for a RMS value of the output voltage within +/−5% of nominal but does not correct the THD of the output voltage. Moreover, it is very sensitive to the proper synchronization of the correction waveform to the output voltage. A slight angular error may produce a glitch in the voltage waveform. The difference between the results of this blanking compensation and the desired value of the output RMS voltage and THD are due to the zero-current clamping. Unfortunately, the inverter-filter case is more complex and the blanking time cannot be compensated alone without considering the zero current clamping.

Zero current clamping is an issue each time the current crosses zero, where the conduction changes from an IGBT device to the anti-parallel diode. If the inverter is switched at near zero current, the conducting device turns-off while the conduction of the other device is delayed. There is not enough energy in the load circuit to turn on the anti-parallel diode and there is no voltage before the IGBT is actually turned-on by the control. Even the turn-on of an IGBT at zero current takes place with a large turn-on time. At high switching frequencies, this affects the quality of the output voltage waveform. This current-dependent distortion is inherent to semiconductor devices and it is usually called zero current clamping This distortion is minimal within a motor drive system since there is only a zero crossing on each fundamental component of the current, but very important within an inverter-filter system.

In an inverter-filter assembly, the sinusoidal output voltage is created with low-pass filtering of a modulated train of voltage pulses. At any given pulse, the current through the inductor and the voltage across the capacitor within the filter are determined from their initial value and the width of the applied pulse. When a pulse is shorter than expected, the equivalent "volt*sec" product decreases and the value of the current at the end of the interval is smaller. If the initial value of the current on the following pulses is different than expected due to any physical characteristic of the circuit, the final and the average values for those pulses are modified. If the inductor current is different from the expected value due to circuit related issues, the voltage on the output capacitor is other than sinusoidal. The current distortion determines a "shoulder" of the output voltage and a reduction of the RMS value of the output voltage, also known as waveform flat-topping. The affected region will be shifted if the load power factor is not unity. The loss in voltage RMS is not the only negative effect of the waveform flat-topping. As mentioned, the THD of the output voltage is also altered and a strong third harmonic is introduced. This voltage error is not due to the effect of the blanking time alone since the current bounces around the zero axis during each sampling period and it never clearly defines the "one-direction current" interval. Even a zero blanking time would not produce the required 120 Vrms voltage. On the other hand the blanking time definitely has an influence on the zero current clamping. The larger the blanking time, the larger the zero current clamping interval.

BRIEF SUMMARY OF THE INVENTION

It is therefore an object of this invention to provide an improved, non-linear compensation system and method for inverter-filter applications.

It is a further object of this invention to provide such an improved, non-linear compensation system and method which compensates for RMS values of inverter output voltage especially for distortions resulting from blanking time and zero current clamping errors.

It is a further object of this invention to provide such an improved, non-linear compensation system and method which reduces total harmonic distortion in the output voltage.

It is a further object of this invention to provide such an improved, non-linear compensation system and method which is simple and inexpensive to implement.

It is a further object of this invention to provide such an improved, non-linear compensation system and method which is easily implemented in DSP software without added circuitry or components.

The invention results from the realization that an improved non-linear compensation system and method with addresses blanking time and zero current clamping distortions in the output voltage of an inverter-filter can be achieved by comparing the average output current with discontinuous current mode threshold values to determine when the average output current is entering a discontinuous current mode and introducing a compensation voltage to the converter drive voltage, in response to the average output current entering a discontinuous current mode, to compensate for discontinuous current mode distortion of the inverter output voltage.

The subject invention, however, in other embodiments, need not achieve all these objectives and the claims hereof should not be limited to structures or methods capable of achieving these objectives.

This invention features an inverter-filter non-linearity blanking time and zero current compensation system having a current measurement circuit for measuring the average output current of an inverter and a comparator circuit for comparing the average output current with discontinuous current mode threshold values for determining when the average output current is entering a discontinuous mode. There is a compensation circuit responsive to the average output current entering a discontinuous current mode, for introducing a compensation voltage to the inverter reference voltage to compensate for discontinuous current mode distortion of the inverter output voltage.

In one embodiment the compensation circuit may include a waveform generator for generating a compensation waveform. The compensation waveform may include a sinusoidal waveform. The compensation circuit may include a start ramp generator and a finish ramp generator for generating start and finish ramps. The compensation circuit may include a ramp control circuit for combining the start and finish ramps with the compensation waveform to form the compensation voltage. The comparator circuit may include a storage device for storing the discontinuous current mode threshold values. The discontinuous current mode threshold values may be generated from $$I_{av}(\omega t) = \frac{\left[\frac{Vdc}{2}\right]^2 - [V \cdot \sin\omega t]^2}{L \cdot 2 \cdot T_S \cdot Vdc}$$

where V is a predetermined nominal voltage. Alternatively, for one part of each output voltage cycle V may be a predetermined nominal voltage and for the other part of each output voltage cycle V may be a predetermined distorted voltage. The compensation voltage for the inverter drive voltage may be a scaled function of the difference between the inverter output voltage and the distorted inverter output voltage.

This invention also features an inverter-filter non-linearity blanking time and zero current clamping compensation method which includes comparing the average output current with discontinuous current mode threshold values to determine when the average output current is entering a discontinuous current mode. A compensation voltage is introduced to the inverter reference voltage in response to the average output current entering a discontinuous current mode in order to compensate for discontinuous current mode distortion of the inverter output voltage.

In one embodiment the method may include generating discontinuous current mode threshold values. Introducing a compensation voltage may include generating a compensation waveform; that waveform may be sinusoidal. Introducing a compensation voltage may include generating a compensation waveform; that waveform may be a sinusoidal. Introducing a compensation voltage may include providing a start ramp and a finish ramp. It may further include combining the ramps with the compensation waveform to form the compensation voltage. Generating discontinuous current mode threshold values may include retrieving them from a look-up table or it may include calculating them from the expression:

$$I_{av}(\omega t) = \frac{\left[\frac{Vdc}{2}\right]^2 - [V \cdot \sin\omega t]^2}{L \cdot 2 \cdot T_S \cdot Vdc}$$

where V is a predetermined nominal value. Or alternatively, V may be predetermined nominal value for one part of each output voltage cycle and it may be a distorted voltage for the other part of the output voltage cycle. The compensation voltage for the inverter drive voltage may be a scaled function of the difference between the nominal inverter output voltage and the distorted output voltage.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
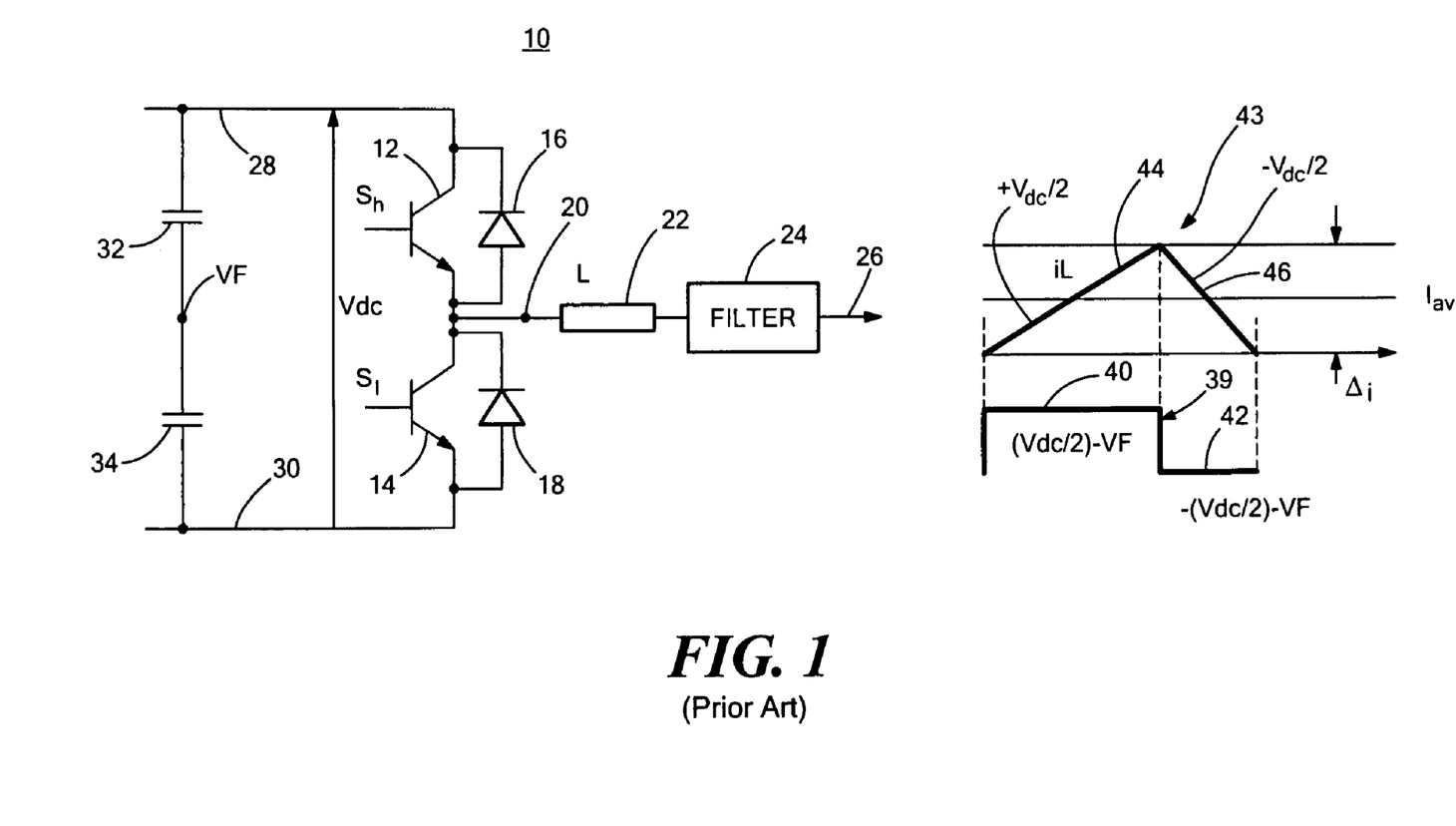
FIG. 1 is a schematic diagram of one prior art inverter-filter leg showing inverter drive voltage and filter output current.

There is shown in FIG. 1, one inverter leg 10 of a conventional, prior art, three phase inverter-filter. Inverter-filter 10 includes a pair of switches 12, 14, such as insulated gate bi-polar transistors (IGBTs), each paralleled by a diode 16, 18 respectively. Switching signals $S_h$ and $S_l$ are applied to the bases of switches 12 and 14 to produce a pulse width modulated (PWM) output at inverter pole 20 to inductor 22 having inductance L, and thence through filter 24 to provide the inverter output at 26. A supply voltage $V_{dc}$ is applied across switches 12 and 14 via lines 28 and 30 connected between which are filter capacitors 32 and 34 providing a mid-point voltage VF.

In any particular period, the pulse width modulated inductor voltage 39 has a positive portion 40, appearing at output 26, represented by the value ($V_{dc}/2-VF$) while the negative portion 42 has the value $-(V_{dc}/2-VF)$. During this positive period current 43 ($I_l$) has a positive slope as at 44 and during the negative portion of the period it has a negative slope 46. The peak to peak value of the current is referred to as $\Delta i$ while the average current is expressed as $I_{av}$.

In practice positive 40 and negative portions 42 do not exactly follow directly after one another, for if they did there would be a condition, due to practical limitations, where when one was going off and the other coming on there could be a momentary short across the power supply $V_{dc}$. To prevent this, a delay called blanking time is purposely introduced between the turning off of one of switches 12 and 14 and the turning on of the other. This solution, however, creates another problem: "blanking" time error. To alleviate this problem the timing of the switching or reference signals $S_h$, $S_l$ connected to the bases of switches 12 and 14 are shortened to avoid any possible overlap.

Figure 2:
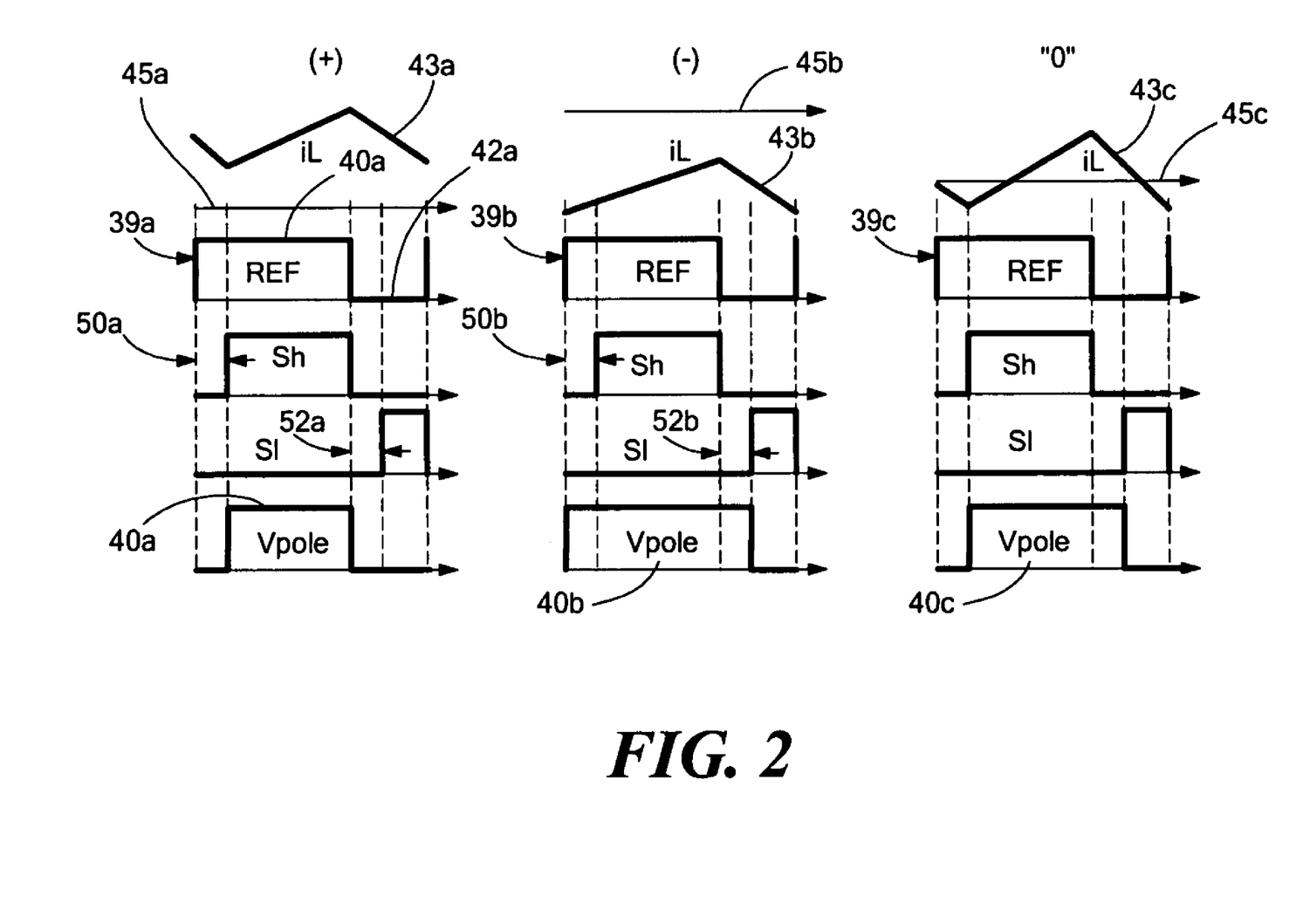
FIG. 2 illustrates the inverter drive voltage waveforms with blanking time occurring in the prior art inverter-filter leg of FIG. 1 for filter output currents, positive, negative and at zero.

Thus, while the switching or reference signal having positive 40 and negative 42 portions is the ideal, the actual switching signal $S_h$ is slightly shorter for the positive portion of the cycle leaving a gap or blank 50a, FIG. 2. Similarly, switching signal $S_l$ is also shortened leaving a gap or blank 52a, so that there can clearly be no overlap of the on conditions of switches 12 and 14. However, this shortening of the switching signal $S_h$ and $S_l$, FIG. 2, which creates the gaps 50a and 52a result in a shortening of pulse 40 so that it appears as at 40a. Thus the pulse widths of the output signals are foreshortened in the case where $I_l$ 43a is positive 44a with respect to the zero axis 45a. In contrast, if the current $I_l$ 43b is lower than zero axis 45b, gaps 50b and 52b create a pulse 40b which is larger than required. When the current $I_l$ 43c is around zero 45b, then the pulse width modulated pulse 40C is the right size but it is shifted slightly.

Figure 3:
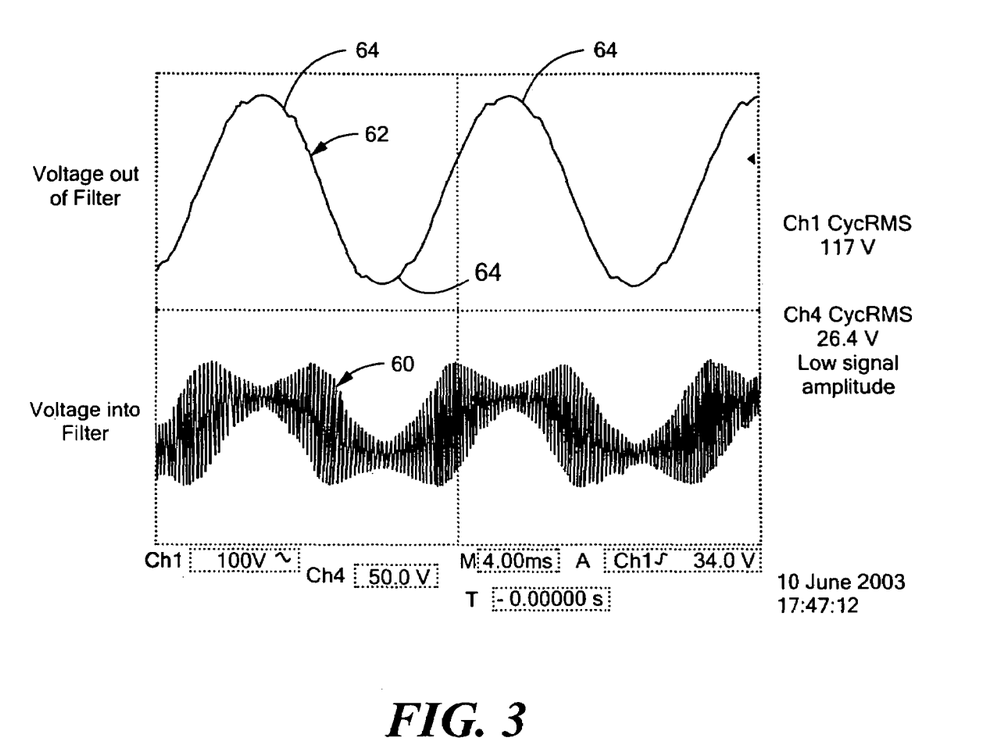
FIG. 3 illustrates the high ripple current into and distorted voltage out of the filter of FIG. 1 due to the blanking time.

The current I, 60, FIG. 3 into filter 24, FIG. 1, has a high ripple factor through the inverter pole 20, FIG. 1. As a result, FIG. 3, the voltage 62 out of filter 24, FIG. 1, is distorted or "flat topped" as shown at 64, FIG. 3.

Figure 4:
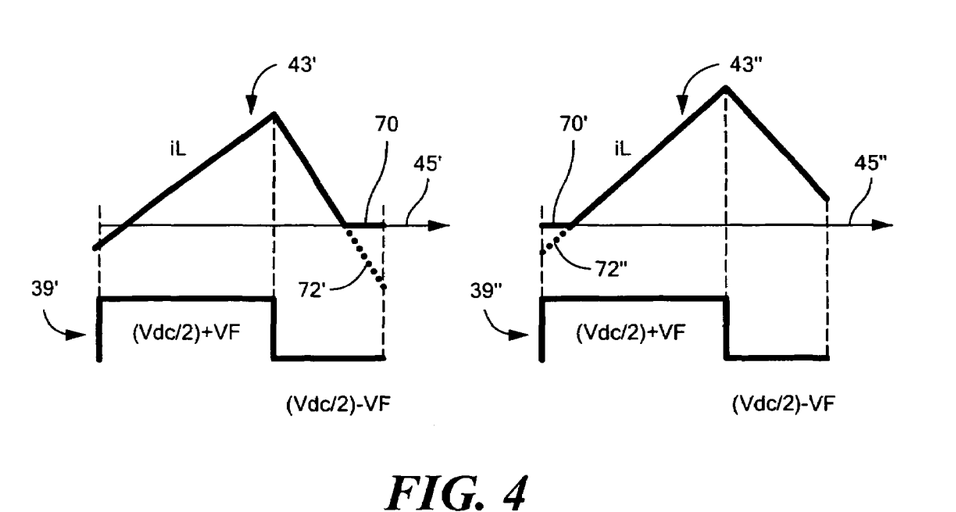
FIG. 4 illustrates zero current clamping occurring in the prior art inverter-filter of FIG. 1.

A second source of error in conventional devices, zero current clamping error occurs because of the natural characteristics of semiconductor devices. When the current $I_l$ 43', 43", FIG. 4, is close to zero 45', 45" a clamping occurs as at 70 and 70' where the current clamps to zero instead of following the normal path 72' 72".

Figure 5:
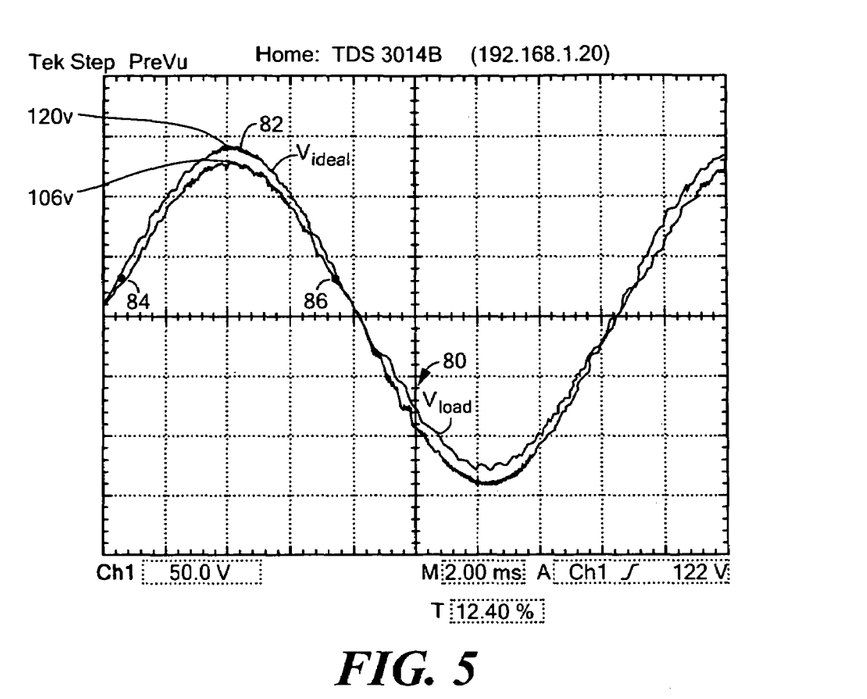
FIG. 5 illustrates the ideal inverter output voltage and the actual inverter output voltage distorted due to blanking time and zero current clamping errors.

The combination of these non-linearities including blanking time and zero current clamping results in a voltage output at the load 80, FIG. 5, which is less than the ideal or required voltage 82, such as a nominal voltage of 120V. For example, in one instance the output voltage 80 at the load reaches only 106 volts: 14 volts short of the 120 volt peak of the ideal required voltage 82.

In accordance with this invention, in order to correct this voltage, it is first required to find the points 84, 86, for example in FIG. 5, where the two voltage curves diverge: the discontinuous current mode, and then generating a compensation voltage for the period of that mode. In accordance with this invention it is understood that at the limit of the discontinuous current mode (DCM), with uni-power factor, the circuit voltage equations for the filter inductor yield:

$$\begin{cases} \left[\frac{Vdc}{2}\right] - V_F = L \cdot \frac{di}{dt} \\ -\left[\frac{Vdc}{2}\right] - V_F = L \cdot \frac{di}{dt} \\ t_1 + t_2 = T_S \end{cases} \quad (1)$$

$$\begin{cases} \left[\frac{Vdc}{2}\right] - V_F = L \cdot \frac{\Delta i}{t_1} \\ \left[\frac{Vdc}{2}\right] + V_F = L \cdot \frac{\Delta i}{t_2} \\ t_1 + t_2 = T_S \end{cases} \quad (2)$$

$$\begin{cases} T_S = \frac{L \cdot \Delta i}{\left[\frac{Vdc}{2}\right] - V_F} + \frac{L \cdot \Delta i}{\left[\frac{Vdc}{2}\right] + V_F} \end{cases} \quad (3)$$

$$T_S = \frac{L \cdot 2 \cdot I_{av} \cdot Vdc}{\left[\frac{Vdc}{2}\right]^2 - [V \cdot \sin\omega t]^2} \quad (4)$$

Figure 6:
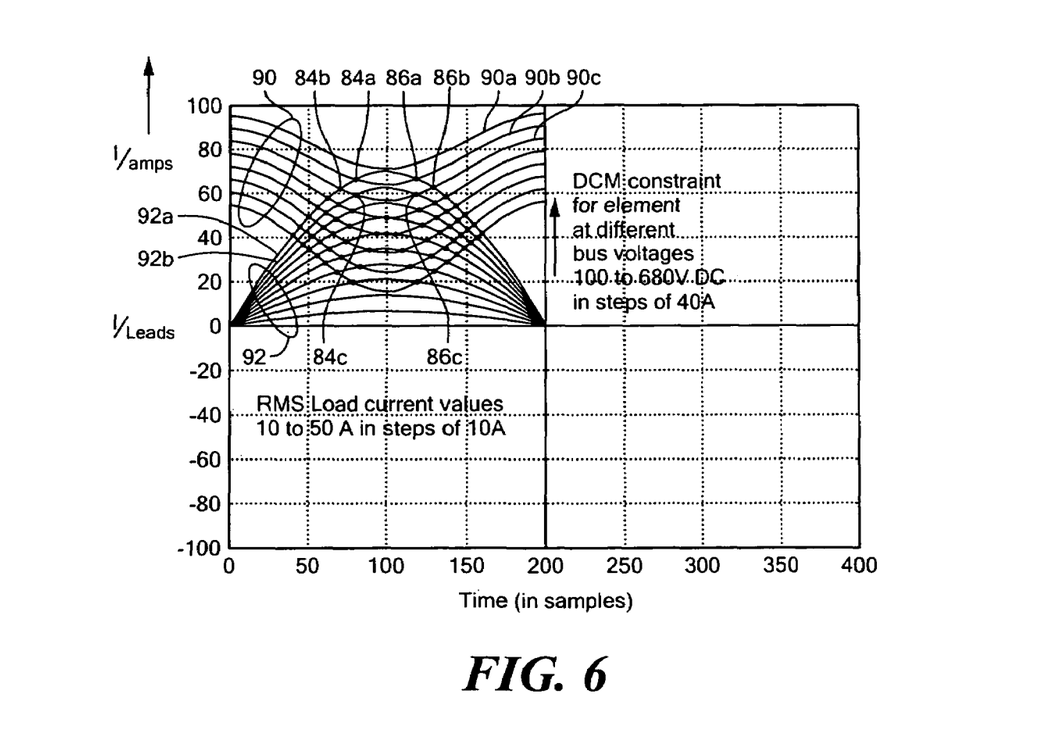
FIG. 6 is a representation of the inverter output or local current and the average current for different bus voltages illustrating the change in distortion or "flat topping" of the output voltage with applied voltage and output current.
Figure 7:
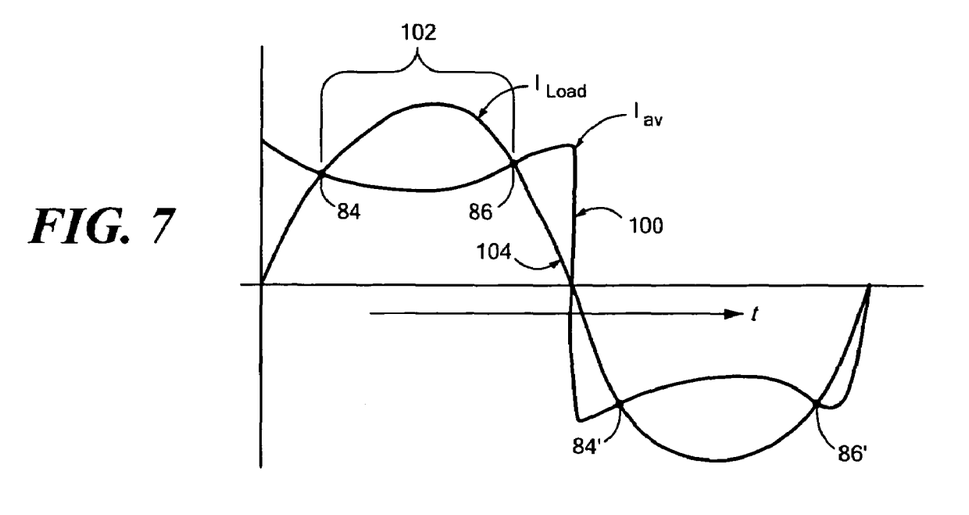
FIG. 7 shows the calculated average current and load current waveform intersections that define "flat top" region where the discontinuous current mode occurs.

For any given inverter system characterized by a DC voltage, a filter inductor L, and a switching period, $T_S$ there is a value of the load current that may produce discontinuous current mode at any time. This is depicted in FIG. 6, where there are a number of $I_{av}$ average curves 90 calculated for a number of different bus voltages shown in conjunction with a number of load currents $I_{load}$ 92 for a number of different currents. There it can be seen that for a high enough voltage 90a, there is no intersections with any of the currents 92 and so there is no discontinuous current mode. However, for lower voltages, more in the range of general desirability, the discontinuous current mode is a factor. For example, at the next lower voltage 90b, it can be seen that there is an intersection with the highest current curve 92a so that intersecting points 84a and 86a define a discontinuous current mode. Similarly, with a lower voltage 90c there occur intersection points 84b and 86b with current 92a as well as intersection points 84c and 86c with voltage characteristic 92b and so on. This critical current in each case may be calculated with:

$$I_{av}(\omega t) = \frac{\left[\frac{Vdc}{2}\right]^2 - [V \cdot \sin\omega t]^2}{L \cdot 2 \cdot T_S \cdot Vdc} \quad (5)$$

when this condition is met, the output voltage waveform becomes distorted. These threshold values result in a characteristic 100, FIG. 7, for $I_{av}$ that can be used to determine whether and where occurs the discontinuous current mode 102 for any particular value of load current 104, $I_{load}$. The discontinuous current mode is the mode occurring between points 82 and 84 on the load current curve 104.

The complex and nonlinear characteristics of the phenomena at zero-current clamping make difficult the development of a compensation method especially designed for the inverter-filter case. The solution used for the inverter-motor drive case is based on applying a pulse (spike) of voltage during the time intervals when the zero-current occurs. Therefore, this is not a real waveform compensation method, but rather a method to avoid zero-current clamping. The problems arise from the difficulty in properly synchronizing the application of a pulse with the region of zero-current and totally nonlinear (violent even) character of the compensation. These two aspects may jeopardize the results within a system experiencing large temperature changes and technological parameter variation of the passive components. Furthermore, this problem cannot be corrected at the pulse level since a wider pulse will make the current pass through zero, but will produce different final and average values of the current. There the approach at the inverter uses the average level (low frequency) through a proper modification of the fundamental frequency reference.

For a better harmonic compensation the actual difference between the actual and desired voltage waveforms in FIG. 5 is used. The voltage development stops during the interval with the zero current clamping and it starts building up again as soon as the current circulation is re-established. The "flat top" is basically following a sinusoidal waveform with a smaller magnitude. The difference between the two waveforms will also be a portion of a sinusoid.

Figure 8A:
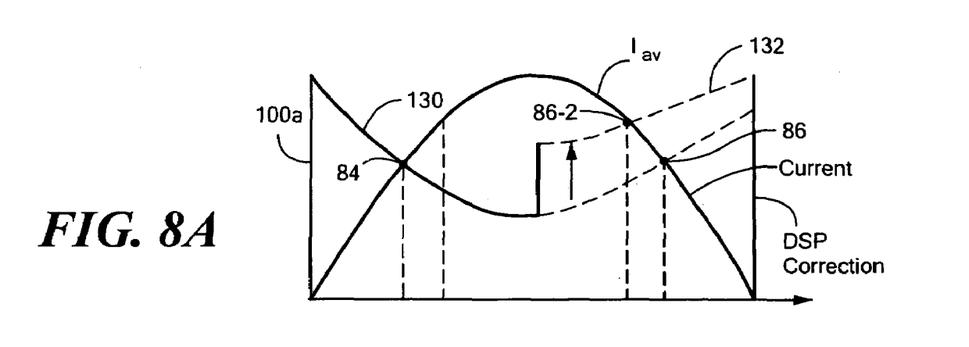
FIGS. 8A and B illustrate a portion of the output voltage waveform depicting the loss of voltage due to flat topping and an improved calculated average current waveform for defining application of a compensation voltage.
Figure 8B:
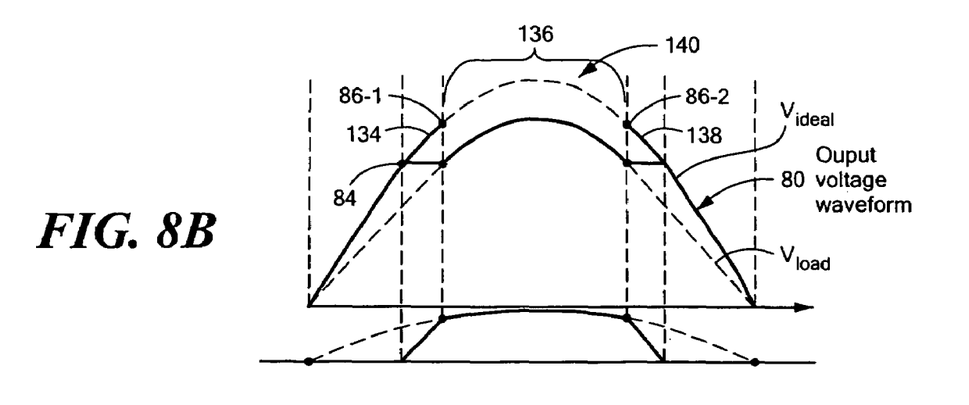

Practically, however, it turns out that attempting to add a portion of a sinusoid on top of the distorted load voltage 80, FIG. 5, in order to reach the ideal 82, encounters a serious problem of attempting to smoothly transition from one to the other. Therefore, a further achievement of this invention generates a start ramp and a finish ramp which are interposed between the distorted load voltage and the compensation waveform to obtain the compensation voltage. To accomplish this the value of $I_{av}$, characteristic value 100a, FIG. 8A, equation (5), is calculated during the first part 130 of the cycle with the voltage V at 120 volts. During the other part 132 of the cycle $I_{av}$ is calculated using V=106 volts, the voltage of the distorted $I_{load}$. This gives two intersection points, 84 as before but not 86 as would be expected if the voltage continued to be 120, but 86-2, FIG. 8A. Then on load voltage 80, FIG. 8B, a start ramp 134 can be introduced at intersection point 84 after which sinusoid 136 is introduced. Then at point 86-2 the finish ramp 138 is introduced. Here, start ramp 134 has a positive slope and finish ramp 138 has a negative slope. However it will be understood that on the negative going portion of the cycle the start ramp 134 would have a negative slope and the finish ramp would have positive slope.

Figure 9A:
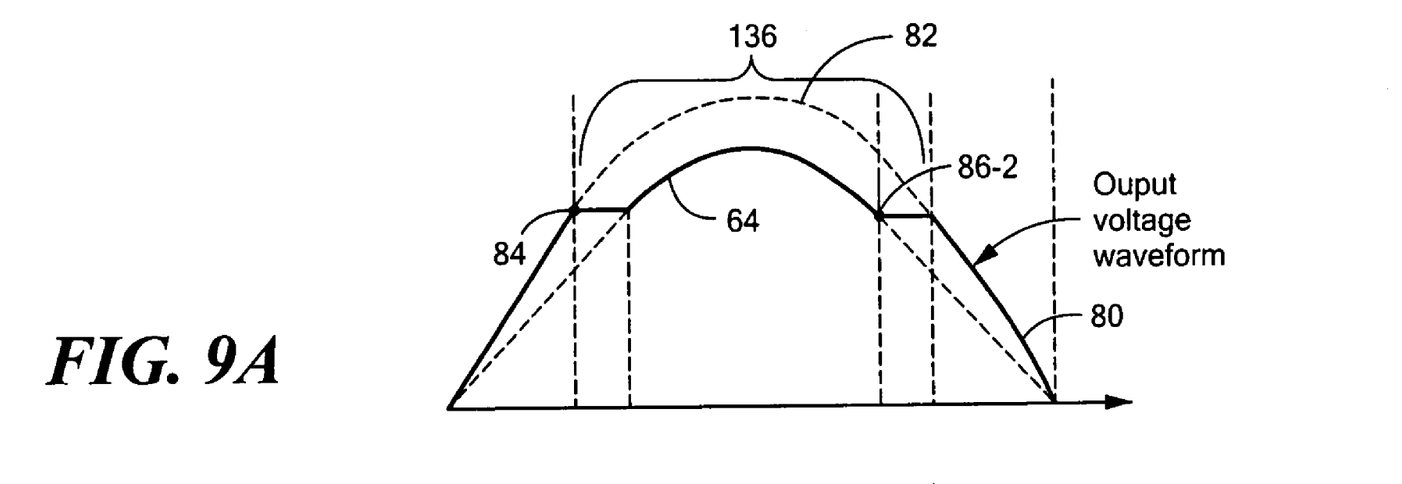
FIGS. 9A and B illustrate the output voltage waveform and the compensation voltage to be applied to it to compensate for the non-linear distortions.
Figure 9B:
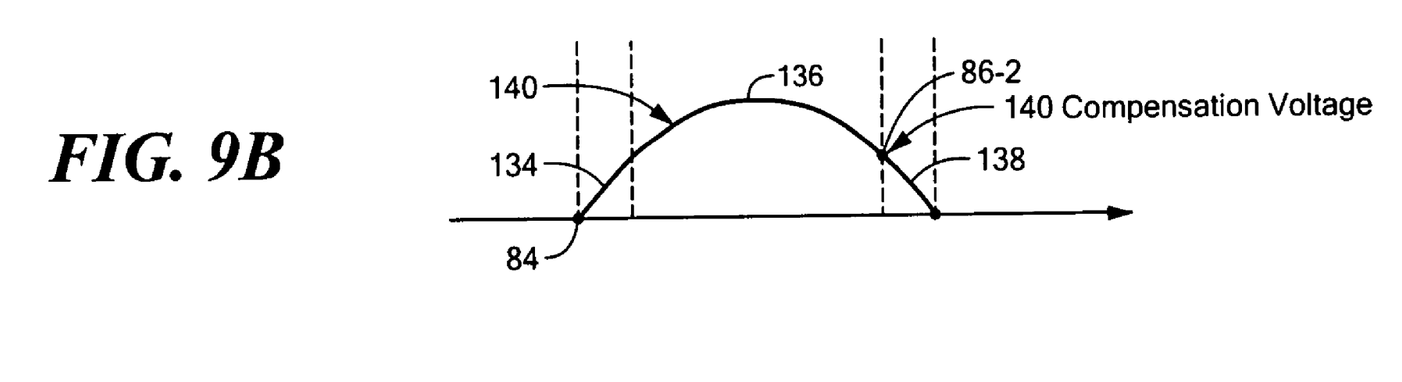

Compensation waveform, sinusoid 136, is calculated off-line and generated by the DSP as the actual difference between the distorted and desired voltage sinusoidal waveforms while ramps 134 and 138 are generated by the DSP with a fixed slope following the intersection points determined as described above. Having generated the compensation voltage 140 composed of ramps 134 and 138 and compensation waveform 136, FIG. 9A, this can now be added to distorted load voltage 80, FIG. 8B, to overcome the distortion of flat-top 64.

Figure 10:
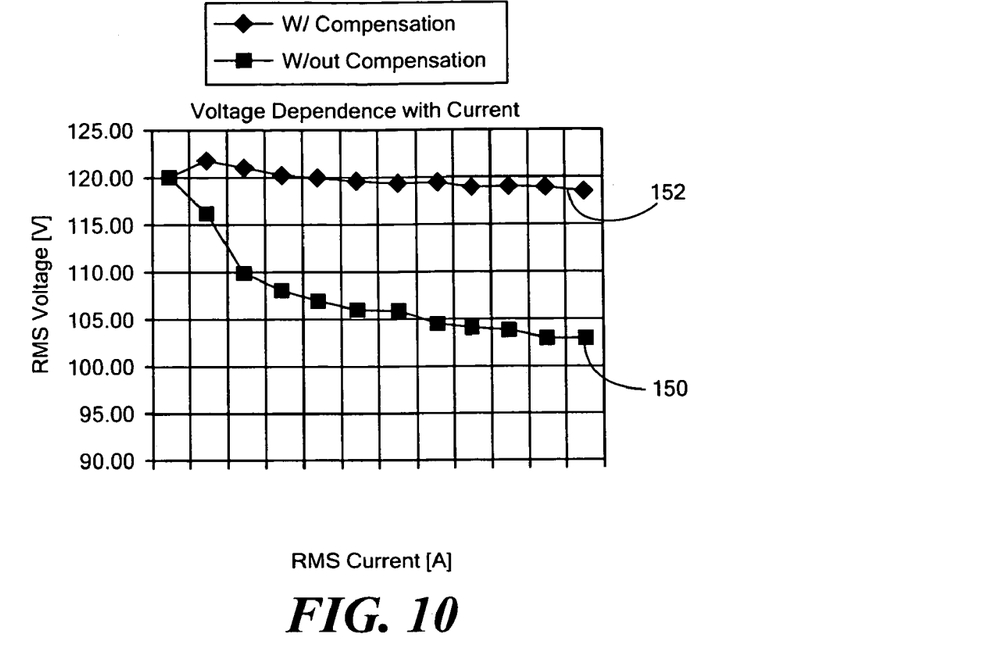
FIGS. 10 and 11 depict the improvement in RMS voltage with current at 60 Hz and 50 Hz, respectively.
Figure 11:
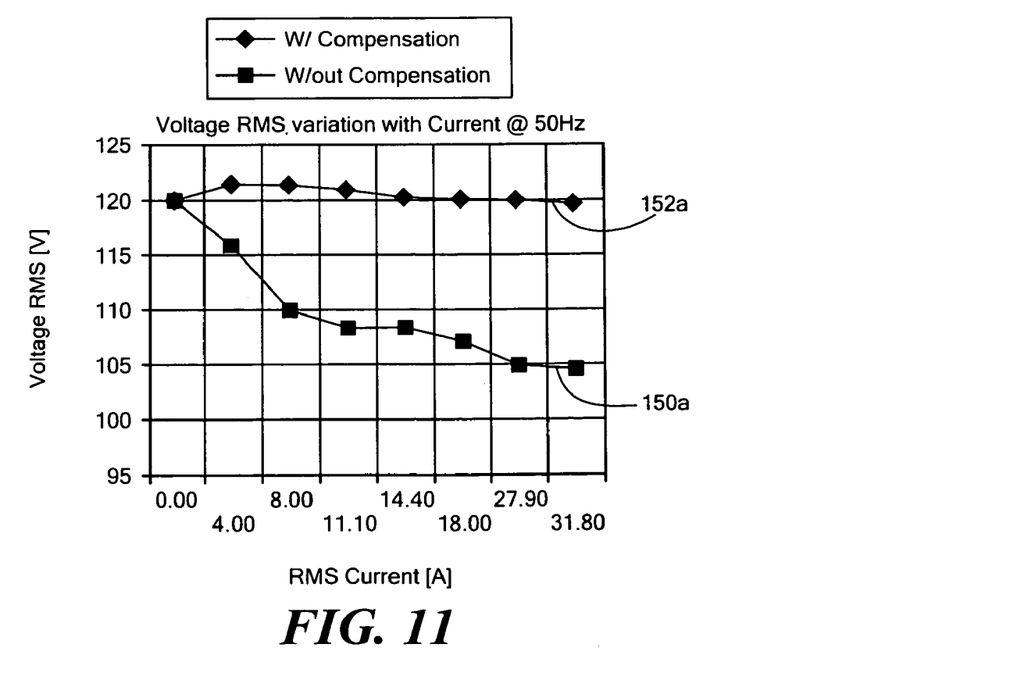
Figure 12:
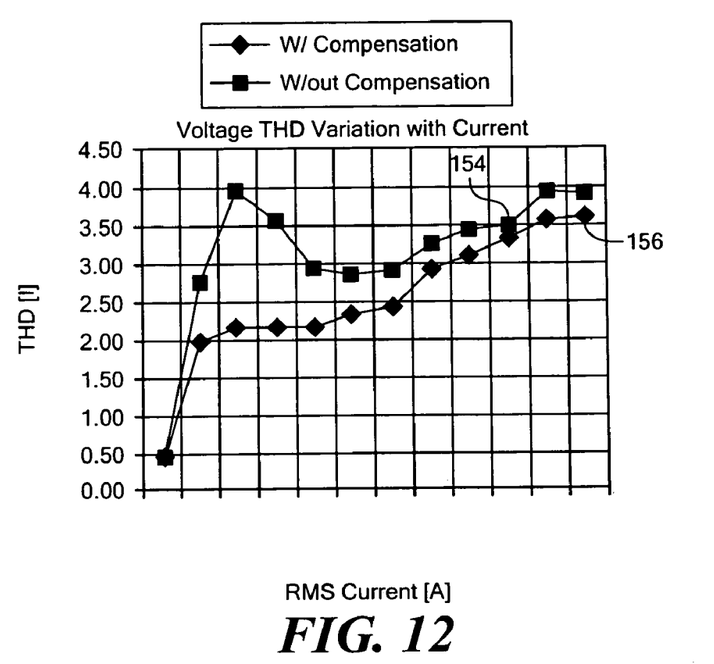
FIGS. 12 and 13 depict the improvement in THD at 60 Hz and 50 Hz, respectively.
Figure 13:
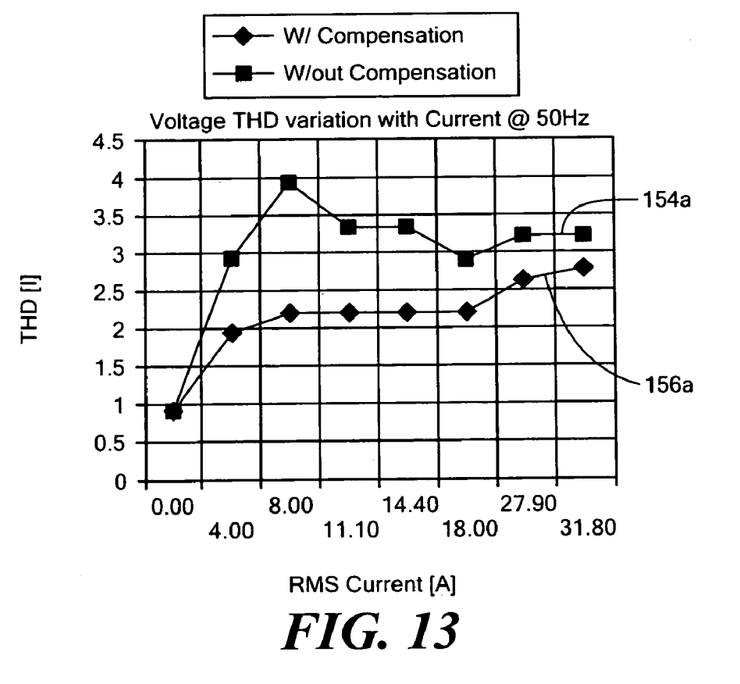

The improvement resulting from this invention is shown in FIGS. 10-12. In FIGS. 10 and 11 it can be seen that the voltage without compensation 150 drops from the nominal voltage of 120 to well below 105 volts, whereas with compensation 152 the voltage barely goes below 120 at 60 cycles. At 50 cycles, FIG. 11, the result is similar where the voltage without compensation 150a is again below 105 volts, whereas with compensation it remains nearly at the nominal 120 volt level 152a. Total harmonic distortion (THD) is also well compensated for as shown in FIGS. 12 and 13. In FIG. 12 at 60 Hz it can be seen that the voltage total harmonic distortion variation without compensation 154 is as high as 4%, whereas with compensation 156 it is no more than 3½%. This is an important margin when faced with requirements, as is often the case, that the total harmonic distortion be kept below 5%: 4% is a bit close to that margin; 3½% is a lot better. At 50 Hz, FIG. 13, the results are also good, as it can be seen that the total harmonic distortion 154a, FIG. 13, for 50 Hz is as high as 4% where with compensation 156a it never rises above 3%.

Figure 14:
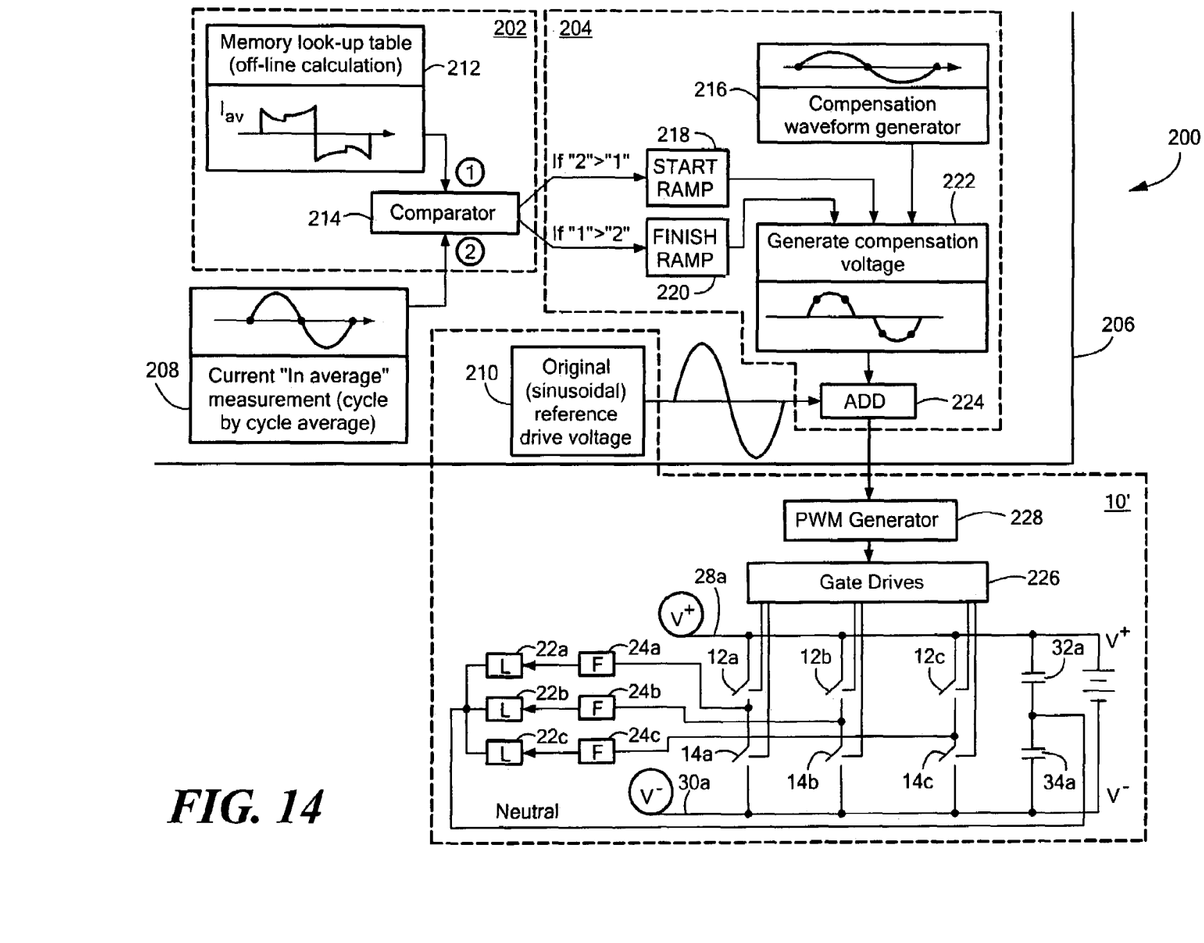
FIG. 14 is a schematic block diagram of an inverter-filter with a non-linear compensation system of this invention.

In one embodiment a three phase inverter 10' is driven by an inverter-filter non-linearity blanking time and zero current clamping compensation system 200, FIG. 14, including a comparator circuit 202 and a compensation circuit 204 all of which may be contained on a single DSP chip 206 which also may contain current average measurement circuit 208 and sinusoid reference drive 210. Comparator circuit 202 in this embodiment includes a memory look-up table or off line calculation 212 and a comparator 214. Compensation circuit 204 includes a compensation waveform generator 216, start ramp 218, finish ramp 220, a compensation voltage generator 222 and adder 224. Inverter 10' includes gate drivers 226, for driving switches 12a, 14a, 12b, 14b, and 12c and 14c in a full three phase inverter arrangement. A pulse width generator 228 provides the switching signals to gate driver 226.

In operation comparator 214 compares the average current from average current measurement circuit 208 with the values in memory look-up table 212. If the average current exceeds that of the discontinuous current mode threshold values, then start ramp 218 is activated. The compensation voltage seen as the output of the compensation circuit 222 follows this ramp until the ramp equals the sinusoidal waveform generated by 216. When the average current measurement by circuit 208 becomes less than that from memory look-up table 212, finish ramp circuit 220 supplies the finish ramp to compensation circuit 222. In this way the entire compensation voltage is constructed and delivered to adder 224 which combines that with the original sinusoidal reference drive voltage 210. This output is then used by pulse width modulation generator 228 to generate the signals to gate drivers 226 for driving switches 12a-12c and 14a-14c so that the output of the inverter will be closer to the ideal since they have been compensated for distortions.

Figure 15:
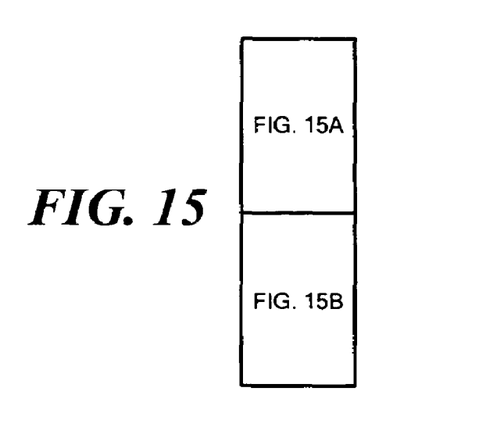
FIG. 15 is a directory of FIGS. 15A and 15B which are flow block diagrams of the non-linear compensation method of this invention applied to an inverter-filter.
Figure 15A:
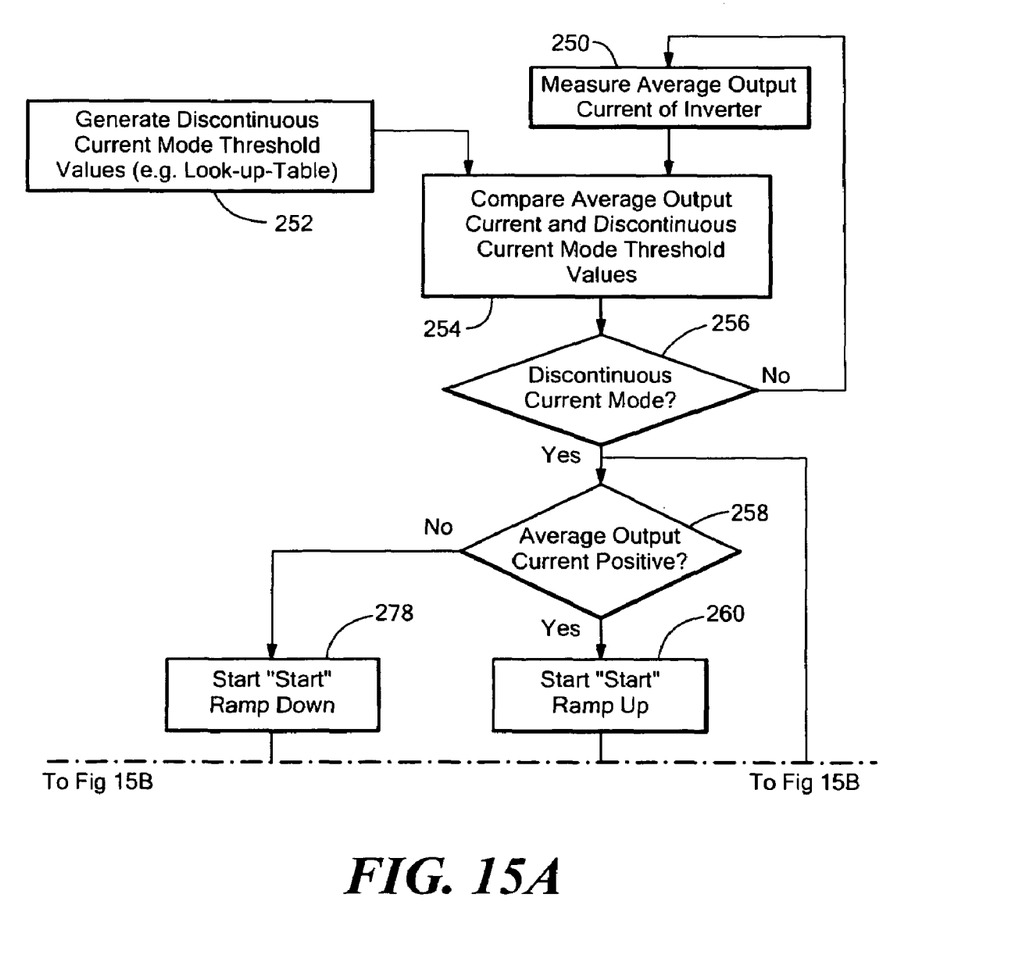
Figure 15B:
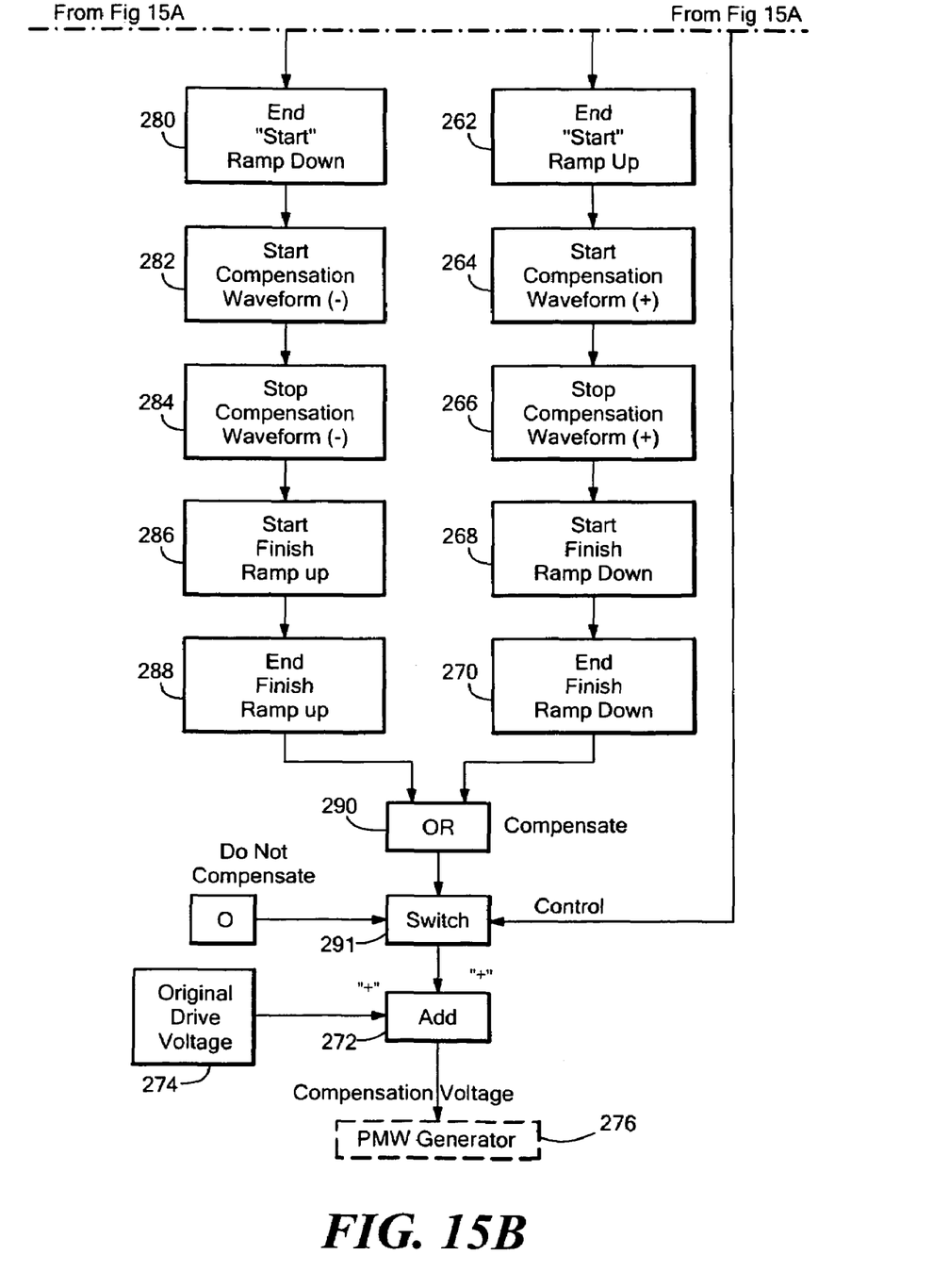

This invention also contemplates a method of inverter-filter non-linearity blanking time and zero current clamping compensation. The method according to this invention is shown in FIGS. 15, 15A and 15B where the average output current of the inverter is measured, 250, and the discontinuous current mode threshold values are generated or looked up 252. The measured average output current and the discontinuous current mode threshold values are compared in absolute values 254. If a discontinuous current mode has not occurred 256 (that is the measured average output current is less than discontinuous current mode threshold in absolute values), the system goes back to step 250 and the PWM generator 276 works with the original reference voltage 274 without any additional compensation. If discontinuous current mode condition has occurred (that is the measured averaged output current is larger than discontinuous current mode threshold in absolute values), then the query is made as to whether the measured averaged output current is positive 258. If it is, then start ramp up occurs 260, ramp up is ended 262, and the compensation sinusoidal waveform is generated 264. The compensation waveform generation is stopped 266. The finish ramp is then started 268 and when the finish ramp is ended 270, it is combined 272 with the original drive voltage 274 to provide the compensated voltage to the pulse width modulation generator 276. If at 258 the average output current is not positive, then the start ramp down is started 278, after which the start ramp down is ended 280 and the compensation waveform is started 282. When it is completed 284, then the finish ramp up 286 begins after which the finish ramp up is ended at 288. The waveforms are ORed together 290, and depending upon the condition of switch 291 in response to input from 256 compensation is applied or not. The completed waveform is then added 272, to the original drive voltage 274 as before to come up the compensation voltage for pulse width modulation generator 276.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. An inverter-filter non-linearity blanking time and zero current clamping compensation system comprising:
    a current measurement circuit for measuring an average output current of an inverter;
    a comparator circuit for comparing said average output current with discontinuous current mode threshold values for determining when said average output current is entering a discontinuous current mode; and
    a compensation circuit, responsive to said average output current entering a discontinuous current mode, for introducing a compensation voltage to the inverter reference voltage to compensate for discontinuous current mode distortion of the inverter output voltage.

2. The inverter-filter non-linearity compensation system of claim 1 in which said compensation circuit includes a waveform generator for generating a compensation waveform.

3. The inverter-filter non-linearity compensation system of claim 2 in which said compensation waveform includes a sinusoidal waveform.

4. The inverter-filter non-linearity compensation system of claim 3 in which said compensation current includes a start ramp generator and a finish ramp generator for generating start and finish ramps.

5. The inverter-filter non-linearity compensation system of claim 4 in which said compensation circuit includes a ramp control circuit for combining said start and finish ramps with said compensation waveform to form said compensation voltage.

6. The inverter-filter non-linearity compensation system of claim 1 in which said comparator circuit includes a storage device for storing the discontinuous current mode threshold values.

7. The inverter-filter non-linearity compensation system of claim 1 in which said discontinuous current mode threshold values are generated from $$I_{av}(\omega t) = \frac{\left[\frac{Vdc}{2}\right]^2 - [V \cdot \sin\omega t]^2}{L \cdot 2 \cdot T_S \cdot Vdc}$$

where V is a predetermined nominal voltage, Vdc is a DC voltage, L is a filter inductor, and $T_s$ is a switching period.

8. The inverter-filter non-linearity compensation system of claim 7 in which, for one part of each output voltage cycle, V is a predetermined nominal voltage and, for an other part of each output voltage cycle, V is a predetermined distorted voltage.

9. The inverter-filter non-linearity compensation system of claim 1 in which said compensation voltage for said inverter reference voltage is a scaled function of the difference between a nominal inverter output voltage and a distorted inverter output voltage.

10. An inverter-filter non-linearity blanking time and zero current clamping compensation method comprising:
 comparing an average output current with discontinuous current mode threshold values to determine when the average output current is entering a discontinuous current mode; and
 introducing a compensation voltage to an inverter reference voltage, in response to the average output current entering a discontinuous current mode, to compensate for discontinuous current mode distortion of the inverter output voltage.

11. The inverter-filter non-linearity compensation method of claim 10 further including generating discontinuous current mode threshold values.

12. The inverter-filter non-linearity compensation method of claim 10 in which introducing a compensation voltage includes generating a compensation waveform.

13. The inverter-filter non-linearity compensation method of claim 12 in which said waveform is sinusoidal.

14. The inverter-filter non-linearity compensation method of claim 12 in which introducing the compensation voltage includes providing a start ramp and a finish ramp.

15. The inverter-filter non-linearity compensation method of claim 12 in which introducing the compensation voltage includes providing a start ramp and a finish ramp and combining said ramps with said compensation waveform to form said compensation voltage.

16. The inverter-filter non-linearity compensation method of claim 11 in which generating discontinuous current mode threshold values includes retrieving them from a look-up table.

17. The inverter-filter non-linearity compensation method of claim 11 in which generating discontinuous current mode threshold values includes calculating them from the expression:

$$I_{av}(\omega t) = \frac{\left[\frac{Vdc}{2}\right]^2 - [V \cdot \sin\omega t]^2}{L \cdot 2 \cdot T_S \cdot Vdc}$$

where V is a predetermined nominal values, Vdc is a DC voltage, L is a filter inductor, and $T_s$ is a switching period.

18. The inverter-filter non-linearity compensation method of claim 17 in which, for one part of each output voltage cycle, V is a predetermined nominal valve and, for an other part of said output voltage cycle, V is a predetermined distorted voltage.

19. The inverter-filter non-linearity compensation method of claim 10 in which said compensation voltage for said converter drive voltage is a scaled function of the difference between a nominal inverter output voltage and a distorted inverter output voltage.

* * * * *